United States Patent
Kern-Trautmann et al.

(10) Patent No.: US 9,089,091 B2
(45) Date of Patent: Jul. 28, 2015

(54) METHOD AND SYSTEM FOR CONTROLLING AN OPERATING PARAMETER OF A HARVESTING MACHINE

(75) Inventors: Andreas Kern-Trautmann, Estenfeld (DE); Iver Schmalbruch, Rannungen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/119,464

(22) PCT Filed: May 23, 2011

(86) PCT No.: PCT/EP2011/058351
§ 371 (c)(1),
(2), (4) Date: Dec. 19, 2013

(87) PCT Pub. No.: WO2012/159659
PCT Pub. Date: Nov. 29, 2012

(65) Prior Publication Data
US 2014/0114537 A1    Apr. 24, 2014

(51) Int. Cl.
*A01D 41/127* (2006.01)
*A01F 12/58* (2006.01)
*G01M 13/04* (2006.01)
*F16C 19/50* (2006.01)

(52) U.S. Cl.
CPC .......... *A01D 41/127* (2013.01); *A01D 41/1274* (2013.01); *A01F 12/58* (2013.01); *G01M 13/045* (2013.01)

(58) Field of Classification Search
CPC ........ A01D 41/127; F16C 19/50; F16C 13/00
USPC .......... 701/50, 29.7, 31.6, 31.8, 82; 56/327.1, 56/10.2 R; 340/441
See application file for complete search history.

(56) References Cited

U.S. PATENT DOCUMENTS

| | | | |
|---|---|---|---|
| 6,778,894 B2* | 8/2004 | Beck et al. ....................... | 701/50 |
| 7,973,654 B2* | 7/2011 | Ehrhart et al. ................. | 340/441 |
| 8,490,371 B2* | 7/2013 | Roberge ..................... | 56/10.2 R |
| 2003/0229432 A1* | 12/2003 | Ho et al. .......................... | 701/50 |
| 2006/0259225 A1* | 11/2006 | Ono et al. ........................ | 701/82 |

FOREIGN PATENT DOCUMENTS

| | | |
|---|---|---|
| DE | 3021506 A1 | 12/1981 |
| DE | 35353428 A1 | 4/1987 |
| EP | 1495669 A1 | 1/2005 |
| EP | 1826735 A2 | 8/2007 |
| WO | 2010043699 A1 | 4/2010 |

* cited by examiner

*Primary Examiner* — Tan Q Nguyen
(74) *Attorney, Agent, or Firm* — Bryan Peckjian; SKF USA Inc. Patent Dept.

(57) ABSTRACT

A method for controlling operation of a harvesting machine includes using a sensor unit to sense at least one state variable of a rolling-element bearing during operation of the harvesting machine and sending the at least one sensed variable to at least one evaluation unit, analyzing the at least one sensed variable in the at least one evaluation unit and generating at least one analysis result, and starting a process operation based on the at least one analysis result, wherein the process operation includes controlling at least one operating parameter of the harvesting machine and wherein the controlling and the sensing of the sensor unit form a closed loop control circuit.

20 Claims, 2 Drawing Sheets

METHOD AND SYSTEM FOR CONTROLLING AN OPERATING PARAMETER OF A HARVESTING MACHINE

CROSS-REFERENCE

This application is the U.S. National Stage of International Application No. PCT/EP2011/058351 filed on Mar. 23, 2011.

TECHNICAL FIELD

The present invention generally relates to a method and system for controlling operation of the system, such as an agricultural harvesting machine, based upon data from a sensor of a rolling-element bearing.

RELATED ART

A method is known in which a sensor unit senses a state variable of a rolling-element bearing and sends data of the sensing to at least one evaluation unit which analyzes the data.

SUMMARY

A method, in particular a harvesting machine control method, is proposed, in which a sensor unit senses at least one state variable of a rolling-element bearing and sends data of the sensing to at least one evaluation unit which analyzes the data, wherein depending on at least one result which is obtained in the analysis, at least one process operation is started. An "evaluation unit" shall in particular be understood to mean a unit which includes a computational unit, a storage unit, and an operating program stored in the storage unit. An "analyzing of the data" by the evaluation unit shall in particular be understood to mean that the evaluation unit preferably checks, based on the data, whether a temperature of the rolling-element bearing is so high that a further use of the rolling-element bearing would lead to damage of the rolling-element bearing, and/or the evaluation unit preferably checks, based on the data, whether vibrations are occurring in the rolling element bearing, in particular in a radial direction of the rolling element bearing, from which a defect or damage of the inner ring and/or of the outer ring and/or of a rolling element and/or of the rolling element cage of the rolling-element bearing can be inferred. A high efficiency can be achieved using an inventive design. In particular, measures can be taken against an overloading or an impending failure of the rolling-element bearing. In particular, it can be prevented that a machine malfunctions during an operating process, in particular a harvesting machine during a harvesting operation, due to a failure of the rolling-element bearing, wherein costs can be saved by the prevention.

Further, it is proposed that the process operation is at least a controlling of at least one operating parameter of a harvesting machine which controlling, together with the sensing of the sensor unit, form a closed loop control circuit. Thus a safeguarded operation can automatically be achieved.

The at least one operating parameter is preferably a width of a material conveyance channel of the harvesting machine and/or a driving speed of the harvesting machine. A "width" of a material conveyance channel shall be understood in particular to mean a minimum width of the material conveyance channel that prevails with reference to an entire length of extension of the material conveyance channel. State variables of the rolling-element bearing can thereby be effectively influenced.

The process operation is advantageously a notification operation, wherein information about a risk of damage of the rolling-element bearing is reported to an operator of a harvesting machine and/or at least a proposed action is reported to the operator, which leads to a reduction of a risk of damage of the rolling-element bearing, and/or it is reported to the operator when the bearing is estimated to fail. In this way an operation that safeguards the rolling-element bearing can be achieved.

The method preferably takes place in real time. That the method takes place in "real time" shall in particular be understood to mean that the method takes place within a time interval of three seconds, preferably a tenth of a second, and particularly preferably within a hundredth of a second. A fast protection of the rolling-element bearing can thereby be achieved.

In addition, it is proposed that the at least one state variable is a rotational speed of the rolling-element bearing and/or at least one vibration frequency of the rolling-element bearing and/or a temperature of the rolling-element bearing and/or a torque acting on a bearing ring of the rolling-element bearing. In this way, impending or existing damage of the rolling element bearing can be inferred in a simple manner.

Advantageously, the rolling-element bearing is a part of a harvesting machine, and additional data from additional sensor units in additional harvesting machines are analyzed, and at least one signal is sent to at least one harvesting machine based on at least a plurality of analysis results of data of a plurality of harvesting machines. An efficient simultaneous operation of a plurality of harvesting machines can thereby be achieved.

Furthermore, a system is proposed which is provided to perform the method. "Provided" shall be understood in particular to mean specifically designed and/or specifically equipped and or specifically programmed. A high efficiency can thereby be achieved.

The system preferably includes at least a part of a harvesting machine which includes the rolling-element bearing, wherein the system includes an additional part which is different from a part of a harvesting machine and includes the evaluation unit. An efficient construction can thereby be achieved.

In addition, a harvesting machine is proposed which is provided to perform the method. In this way a high efficiency can be achieved.

Further advantages will become apparent from the following description of the drawings. Exemplary embodiments of the invention are shown in the drawings. The drawings, the description, and the claims contain numerous features in combination. The person skilled in the art will also advantageously consider the features individually and in further meaningful combinations.

DETAILED DESCRIPTION OF THE INVENTION

Figure 1:
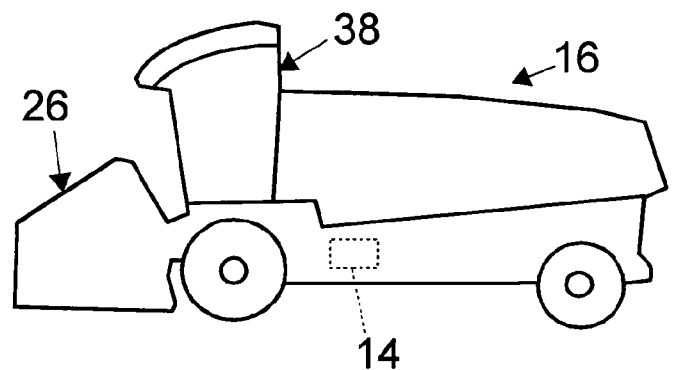
FIG. 1 shows a forage harvester which performs an inventive method.

FIG. 1 shows a system which is provided to perform an inventive method that takes place in real time. The system is a harvesting machine 16 and is formed as a forage harvester. The harvesting machine includes a chopping mechanism 26, which is provided to chop crop material, e.g. corn plants, and which can be decoupled in a non-destructive manner and without tools from a self-propelled part of the forage harvester. During operation, crop material (e.g., corn stalks) is supplied through a conveyance channel 28 to a cutting drum 30 which cuts the supplied crop material into small pieces. In principle, it is conceivable to replace the conveyance channel 28 with feed rollers. The small pieces reach a first and a second kernel processing roll 32, 34, which are part of the self-propelled part of the forage harvester and which are provided to squeeze corn kernels such that their surfaces burst open. The spacing of the kernel processing rolls 32, 34 forms a minimum width 18 of a material conveyance channel 20, through which the crop material is transported. After the crop material has passed through the kernel processing rolls 32, 34, it reaches an accelerator roll 36, which accelerates the crop material such that it is discharged through a spout (not shown) of the self-propelled part of the forage harvester.

The self-propelled part of the harvesting machine includes a rolling-element bearing 12 which supports the kernel processing roll 32. A sensor unit 10 of the self-propelled part of the harvesting machine is disposed on the rolling-element bearing 12, which sensor unit 10 measures, during the operation, the rotational speed of an inner ring of the rolling-element bearing 12 relative to an outer ring of the rolling-element bearing 12. Furthermore, the sensor unit 10 measures the temperature of the rolling-element bearing 12 and vibrations of the rolling-element bearing 12 occurring in radial directions of the rolling-element bearing 12, i.e. amplitudes and frequencies of the vibrations. In addition, the sensor unit 10 measures a torque which acts on the rolling-element bearing 12 during operation. The sensor unit 10 wirelessly sends all sensed data to an evaluation unit 14 of the harvesting machine 16. The data can also be sent via cable. The evaluation unit 14 includes a computational unit, a storage unit, and an operating program. The evaluation unit 14 analyzes the data using an algorithm which is stored in the storage unit. The evaluation unit 14 recognizes when the temperature of the rolling-element bearing 12 has reached a critical value which, during a further operation of the rolling-element bearing 12 at the same operating conditions, would cause the rolling-element bearing 12 to be damaged. The recognition is effected by the evaluation unit 14 by comparing the temperature sensed by the sensor unit 10 to a temperature stored in the evaluation unit 14. If the sensed temperature is above the stored temperature, then the critical value of the temperature is present. In a similar manner, an evaluation of the vibrations sensed by the sensor unit 10 is effected by the evaluation unit 14. The evaluation of the vibrations sensed by the sensor unit 14 is prior art and known to the person skilled in the art. The following formulas for the so-called "bearing defect frequencies" are stored in the storage unit of the evaluation unit 14, which formulas are known to the person skilled in the art:

$$BPFO = \frac{n}{60} * z * \frac{D_{pw} - D_{we}\cos\alpha}{2*D_{pw}}$$

$$BPFI = \frac{n}{60} * z * \frac{D_{pw} + D_{we}\cos\alpha}{2*D_{pw}}$$

$$BSF = \frac{n}{60} * \frac{D_{pw}^2 - D_{we}^2\cos\alpha}{D_{we}*D_{pw}}, BPF = 2*BSF$$

$$FTF = \frac{n}{60} * \frac{D_{pw} - D_{we}\cos\alpha}{2*D_{pw}}$$

Here n is the speed of the rolling-element bearing, z is the number of rolling elements in the bearing, $D_{pw}$ is the rolling-element bearing cage diameter, $D_{we}$ is the rolling-element diameter, and a is the contact angle. If the evaluation unit 14 recognizes frequencies in the data of the sensor unit 10 which match those calculated from the above formulas, then the evaluation unit 14 recognizes critical frequencies. If the evaluation unit 14 recognizes critical frequencies, then it causes a warning message for warning of a risk of damage of the rolling-element bearing 12 to be notified to the driver of the harvesting machine 16 in an optical display unit which is formed as a screen and which is disposed in a cockpit 38 (FIG. 1) of the harvesting machine 16. Furthermore, the display unit displays a proposed action which will lead to a reduction of the risk of damage. This proposed action can in particular be to drive the harvesting machine 16 at a lower speed. From the critical frequencies and an intensity of the occurring critical frequencies, the evaluation unit 14 can conclude therefrom in a known manner when the rolling-element bearing 12 is estimated to be fully defective and unusable in a further operation. This information is notified to the driver of the harvesting machine by the display unit.

If the evaluation unit 14 recognizes a critical value of the temperature, then it causes a speed, at which the harvesting machine travels, to be reduced. Additionally or alternatively it can cause the width 18 to be enlarged. Furthermore, a controlling of the speed by the evaluation unit 14 together with the sensing of the sensor unit 10 can form a closed loop control circuit in such a manner that the temperature of the rolling-element bearing 12 is regulated to a specific, non-critical value by a controlling of the speed. In addition, a controlling of the width 18 by the evaluation unit 14 together with the sensing of the sensor unit 10 can form a closed loop control circuit in such a manner that the temperature of the rolling-element bearing 12 is regulated to a specific, non-critical value by a controlling of the width 18. A time period from a sensing of the sensor unit 10 to a controlling of the speed caused thereby is smaller than a half-second.

In principle, the evaluation unit may be disposed outside the harvesting machine in a control center and may wirelessly send data back to the harvesting machine 16. Furthermore, the sensor unit 10 and the evaluation unit 14 can be retrofitted onto an existing harvesting machine 16.

The sensor unit 10 is integrated in the bearing seat of the rolling-element bearing 12. At least a part of the sensor unit 10 can also be integrated in the shaft.

It is conceivable in particular for a programming of the evaluation unit 14 to at least partially use the program "@ptitude Decision Support."

In principle the described method may also be used on other rolling-element bearings of the harvesting machine 16, such as on rolling-element bearings of the cutting drum 30 and of the accelerator roll 36. In this case the display unit can display the state and/or a risk of damage of each of the bearings in question. In particular, harmful influences of silage juices and dust can be recognized and/or compensated by the described method.

Figure 2:
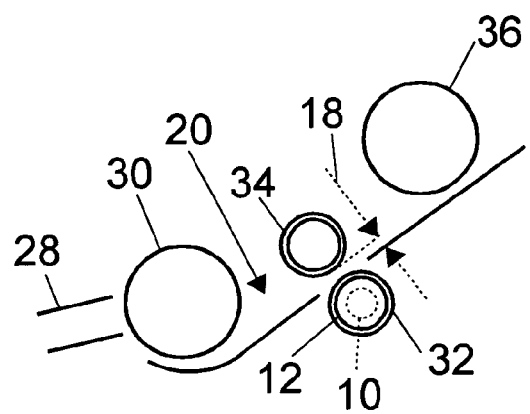
FIG. 2 shows a schematic view of a cut-material conveyance path in a self-propelled part of the forage harvester, and FIG. 3 schematically shows an integration of the forage harvester into a control method that involves a plurality of harvesting machines.
Figure 3:
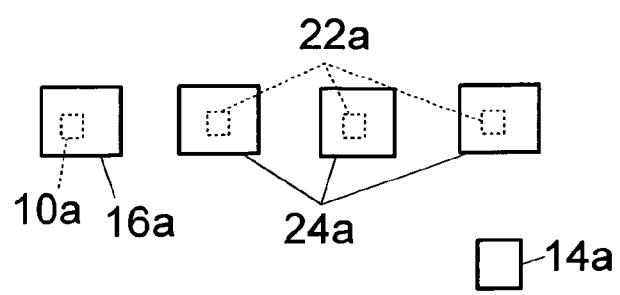

In FIG. 3 an alternative exemplary embodiment is shown. Components, features, and functions remaining substantially identical are generally numbered with the same reference numbers. However, the letter "a" has been added to the reference numbers of the exemplary embodiment in FIG. 3 to differentiate the exemplary embodiments. The following description is essentially limited to the differences to the exemplary embodiment in FIG. 1 to FIG. 2, wherein with respect to components, features, and functions remaining the same, reference can be made to the description of the exemplary embodiment in FIG. 1 to FIG. 2.

FIG. 3 shows an integration of a harvesting machine 16a into a control method that involves a plurality of harvesting machines 16a, 24a. In the control method, in each of the harvesting machines 16a formed as forage harvesters, data of a rolling-element bearing 12, which the harvesting machine 16a, 24a in question includes, obtained in the above-described manner by the sensor units 10a, 22a is sent to an evaluation unit 14a which is disposed in a control center. The evaluation unit 14a analyzes the data. If a risk of damage exists for rolling-element bearings 12 of different harvesting machines 16a, 24a, then the evaluation unit 14a can deactivate those machines 16a, 24a having the greatest risk of damage and leave those machines active which have an existing but comparatively small risk of damage. The harvesting machines 16a, 24a that will be deactivated are thus deactivated depending on the states of the rolling-element bearings in all machines. This is particularly advantageous when the harvesting machines 16a, 24a are working the same field, and the field must be completely worked in a given amount of time.

It is conceivable that the evaluation unit 14a stores the data sent to it, so that the data can be considered in a redesign of the harvesting machines. In this way it can be avoided that a too-conservative construction design leads to an inefficient machine use. Furthermore, by storing the data, a use-dependent planning of maintenance work can be effected.

REFERENCE NUMBER LIST

10 Sensor unit
12 Rolling-element bearing
14 Evaluation unit
16 Harvesting machine
18 Width
20 Material conveyance channel
22 Sensor unit
24 Harvesting machine
26 Chopping mechanism
28 Conveyance channel
30 Cutting drum
32 Kernel processing roll
34 Kernel processing roll
36 Accelerator roll
38 Cockpit

The invention claimed is:

1. A method for controlling operation of a harvesting machine comprising:
using a sensor unit to sense at least one state variable of a rolling-element bearing during operation of the harvesting machine and sending the at least one sensed variable to at least one evaluation unit,
analyzing the at least one sensed variable in the at least one evaluation unit and generating at least one analysis result, and
starting a process operation based on the at least one analysis result, wherein the process operation includes controlling at least one operating parameter of the harvesting machine and wherein the controlling and the sensing of the sensor unit form a closed loop control circuit.

2. The method according to claim 1, wherein the at least one operating parameter is a width of a material conveyance channel of the harvesting machine and/or a traveling speed of the harvesting machine.

3. The method according to claim 2, wherein the process operation further includes a notification process that comprises notifying an operator of the harvesting machine concerning:
at least one proposed action that will lead to a reduction of the risk of damage to the rolling-element bearing, and/or
an estimation as to when the rolling-element bearing will fail.

4. The method according to claim 3, wherein the method takes place in real time.

5. The method according to claim 4, wherein the at least one state variable is:
a rotational speed of the rolling-element bearing,
at least one vibration frequency of the rolling-element bearing,
a temperature of the rolling-element bearing and/or
a torque acting on a bearing ring of the rolling-element bearing.

6. The method according to claim 5, wherein the rolling-element bearing is part of the harvesting machine, and the method further comprises:
analyzing additional data from additional sensor units in additional harvesting machines, and
based on at least a plurality of analysis results for data from a plurality of harvesting machines, sending at least one signal to at least one of the harvesting machines.

7. The method according to claim 1, wherein the at least one operating parameter is a width of a material conveyance channel of the harvesting machine.

8. The method according to claim 1, wherein the at least one operating parameter is a traveling speed of the harvesting machine.

9. The method according to claim 1, wherein the process operation further includes a notification process that comprises notifying an operator of the harvesting machine concerning:
a risk of damage to the rolling-element bearing,
at least one proposed action that will lead to a reduction of the risk of damage to the rolling-element bearing, and/or
an estimation as to when the rolling-element bearing will fail.

10. The method according to claim 1, wherein the at least one state variable is a torque acting on a bearing ring of the rolling-element bearing.

11. The method according to claim 1, wherein the rolling-element bearing is part of the harvesting machine, and the method further comprises:
analyzing additional data from additional sensor units in additional harvesting machines, and
based on at least a plurality of analysis results for data from a plurality of harvesting machines, sending at least one signal to at least one of the harvesting machines.

12. The method according to claim 11, wherein the harvesting machine is a forage harvester and wherein the additional harvesting machines are additional forage harvesters.

13. A system comprising:
an evaluation unit including a computational unit, a storage unit, and an operating program stored in the storage unit, the operating program containing instructions that perform the method of claim 1 when executed by the computational unit.

14. The system according to claim 13, further comprising:
at least a part of a harvesting machine that includes the rolling-element bearing, and
a further part that differs from the part of the harvesting machine that includes the rolling-element bearing, the further part containing the evaluation unit.

15. A forage harvester comprising:
a chopping mechanism, and
the system according to claim 14.

16. The method according to claim 1, wherein the at least one operating parameter is a spacing of a first kernel processing roll from a second kernel processing roll of the harvesting machine.

17. A system comprising:
an evaluation unit including a computational unit, a storage unit, and an operating program stored in the storage unit, the operating program containing instructions that perform the method of claim 16 when executed by the computational unit.

18. The method according to claim 1, wherein the rolling element bearing rotatably supports a first kernel processing roll of the harvesting machine and wherein the at least one operating parameter is a spacing of the first kernel processing roll from a second kernel processing roll of the harvesting machine.

19. A method for controlling at least one operating parameter of a harvesting machine that includes a computational unit, a storage unit, a bearing defect-determination program stored in the storage unit, a rolling-element bearing, and a sensor configured to measure at least one operating characteristic of the rolling-element bearing during operation of the harvesting machine, the method comprising:
causing the sensor to measure at least one operating characteristic of the rolling-element bearing during operation of the harvesting machine,
communicating the measured operating characteristic to the computational unit,
analyzing the measured operating characteristic by executing the bearing-defect determination program to determine whether the bearing currently has a defect and/or to estimate when the bearing will fail, and
adjusting the at least one operating parameter of the harvesting machine in case the bearing is determined to currently have a defect or is estimated to fail within a predetermined time period.

20. A non-transitory computer-readable storage medium encoded with computer-readable instructions for executing the method according to claim 19.

* * * * *